US005573260A

United States Patent [19]

Peterson et al.

[11] Patent Number: 5,573,260

[45] Date of Patent: Nov. 12, 1996

[54] SPORT WHEELCHAIR HAVING A T-FRAME

[75] Inventors: Christopher J. Peterson; Mary C. Peterson, both of Tierra Verde, Fla.

[73] Assignee: Invacare Corporation, Elyria, Ohio

[21] Appl. No.: 135,745

[22] Filed: Oct. 12, 1993

[51] Int. Cl.[6] .......... B62M 1/14

[52] U.S. Cl. .......... 280/250.1; 280/304.1

[58] Field of Search .......... 280/250.1, 304.1, 280/304.5; 297/DIG. 4

[56] References Cited

U.S. PATENT DOCUMENTS

| | | | |
|---|---|---|---|
| 4,523,769 | 6/1985 | Glaser et al. | 280/250.1 X |
| 4,650,201 | 3/1987 | Hartwell | 280/250.1 |
| 4,927,167 | 5/1990 | Davis | 280/304.1 X |
| 5,217,239 | 6/1993 | Koet | 280/250.1 |
| 5,242,180 | 9/1993 | Bergeron | 280/250.1 |
| 5,267,745 | 12/1993 | Robertson et al. | 280/304.1 X |
| 5,326,120 | 7/1994 | Weege | 280/250.1 |
| 5,333,894 | 8/1994 | Mayes | 280/304.1 X |
| 5,338,048 | 8/1994 | Medina | 280/250.1 X |

FOREIGN PATENT DOCUMENTS

| | | | |
|---|---|---|---|
| 2731952 | 1/1978 | Germany | 280/250.1 |
| 3614726 | 11/1987 | Germany | 280/250.1 |

*Primary Examiner*—Brian L. Johnson

*Attorney, Agent, or Firm*—Fay, Sharpe, Beall, Fagan, Minnich & McKee

[57] ABSTRACT

A sport wheelchair includes a T-frame that interconnects enlarged rear wheels and a single small diameter caster front wheel. A footrest is adjustably secured to the T-frame and may be adjusted height wise and front to rear as desired by the user. Additionally, handles extend outwardly from opposite sides of the front edge of the seat in selected embodiments of the invention. In some embodiments, a central support member extends upwardly from the seat so that the handles also function for lateral restraint of the user's legs. In still other arrangements, a pair of side supports extend outwardly and downwardly in place of the handles and provide the lateral support as needed.

13 Claims, 5 Drawing Sheets

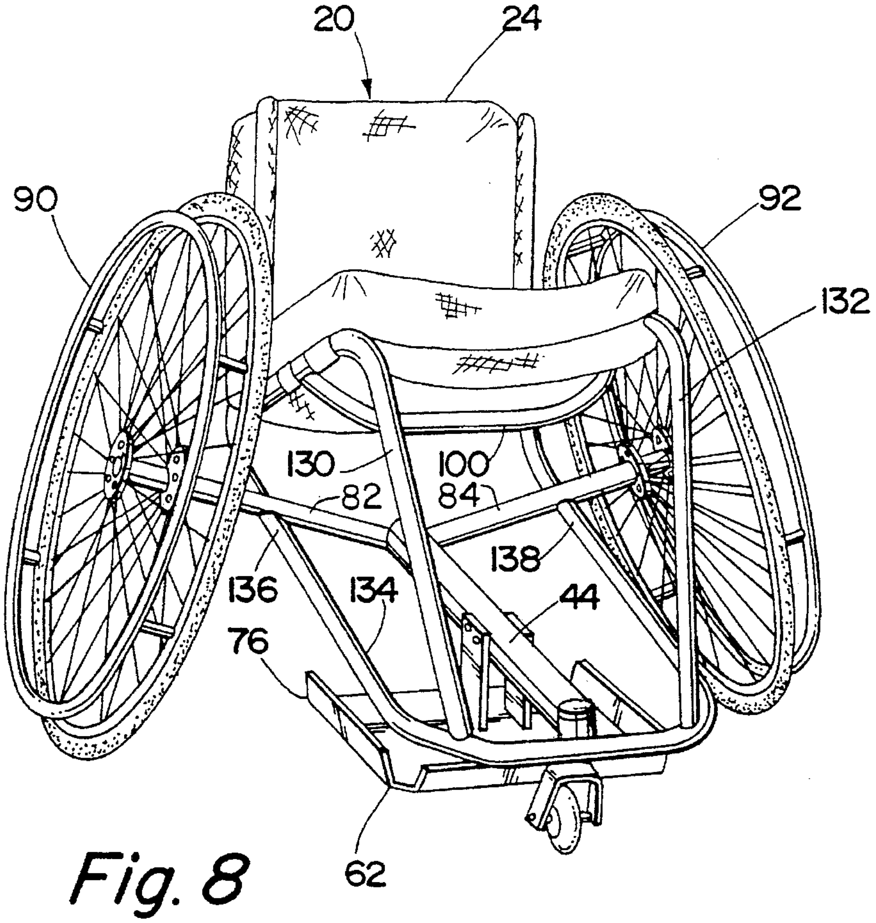
Fig. 8
Fig. 9
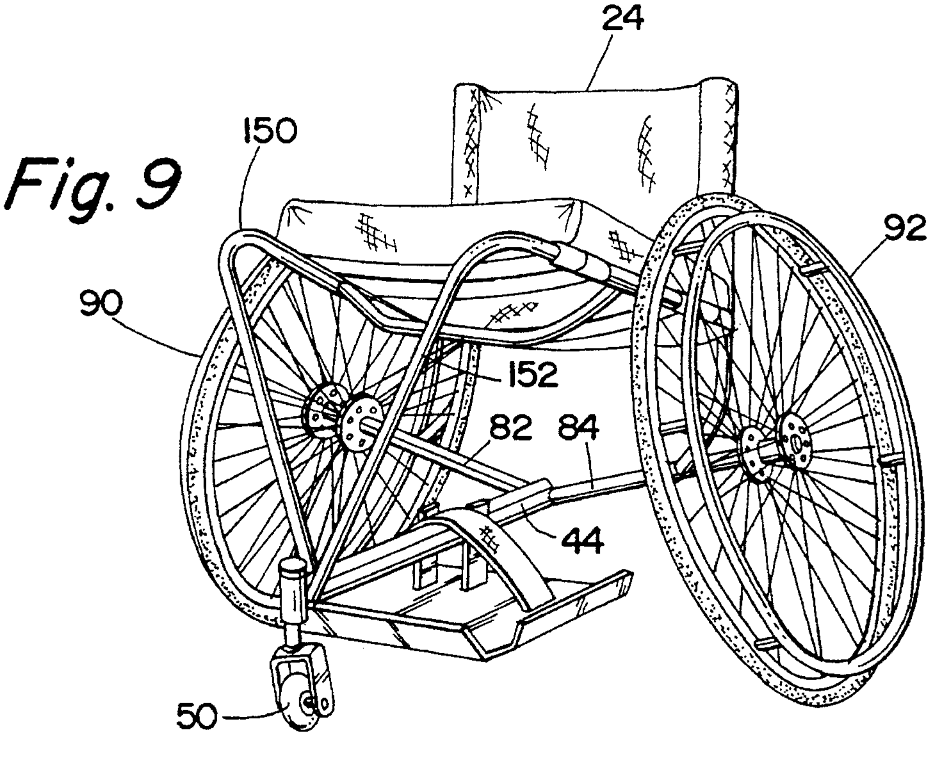

SPORT WHEELCHAIR HAVING A T-FRAME

BACKGROUND OF THE INVENTION

This invention pertains to the art of wheelchairs and more particularly to sport wheelchairs that are durable, lightweight chairs offering various options particularly conducive to various demands and options desired by its user. The invention is particularly applicable to a wheelchair incorporating a T-frame that interconnects a pair of large diameter rear wheels to a single, small diameter caster-mounted front wheel. It will be appreciated, however, that other aspects of the invention may be advantageously employed in other wheelchair environments and applications.

Court wheelchairs or sport wheelchairs are intended as a small sized, lighter weight, decreased rolling resistance, and a sturdy, durable wheelchair structure that meets the various needs of a particular sporting event. It is known in the art to provide a three wheel chair in which the single front wheel is of a relatively small diameter so that the chair has a low profile, extended configuration. For example, wheelchairs of this type are often used for wheelchair racing. The extended length of the known three wheel chair is not conducive to other sport arrangements, particularly where tight turning radius and reduced chair size are required. Some examples of these sporting events would be basketball or tennis where a great degree of maneuverability is required.

Known frame assemblies for chairs of this type have typically relied on a four wheel assembly where a pair of similarly constructed side frames are interconnected by a cross bracing arrangement. Thus, even though attempts have been made to decrease the weight of these arrangements, they still do not meet the needs of reduced size, tight turning radius, minimized rolling resistance, etc. Additionally, conventional footrest assemblies are usually incorporated into these arrangements. The conventional footrest positions a user's legs outboard of the frame assembly where they are more likely subject to potential contact during use.

The subject invention as demonstrated by the various embodiments is deemed to meet these needs and others in a compact, three wheel sport chair.

SUMMARY OF THE INVENTION

The present invention contemplates a new and improved wheelchair that overcomes the above-referenced problems and others and provides a simple, economical chair that satisfies the competing concerns of durability, light weight, and maneuverability.

According to a more limited aspect of the invention, the wheelchair includes a seat supported between a pair of enlarged rear wheels and a front, small diameter wheel secured to the rear wheels by a T-frame assembly. A first member of the frame angles downwardly relative to horizontal as it extends from the rear wheels to the front wheel while outer, distal ends of second and third members comprising the T-frame receive the rear wheels.

According to another aspect of the invention, an adjustable footrest is disposed along the first member of the frame and provides for height and front to rear adjustments as desired by a particular user.

According to yet another aspect of the invention, the foot plate includes an upturned lip that limits movement of a user's feet and provides additional support and guidance.

According to yet another aspect of the invention, at least one embodiment of a seat support assembly includes an angularly extending support member that interconnects with the first member of the frame at one end and supports the seat frame at the other end. Alternative arrangements include a V-frame arrangement or a pair of lateral support members that facilitate support of a user's legs.

According to another aspect of the invention, first and second handles extend outwardly from a front edge of the seat to provide lateral support for a user's legs in an open frame arrangement, while simultaneously allowing the user to stabilize himself by grasping same.

A principal advantage of the invention is the simplified frame assembly that provides a compact, maneuverable wheelchair.

Yet another advantage of the invention resides in the ability to adjust the footrest for convenience of the user.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 8 is a perspective view of a second preferred embodiment; and

FIG. 9 is a perspective view of a third preferred embodiment.

DETAILED DESCRIPTION OF THE PREFERRED EMBODIMENTS

Figure 1:
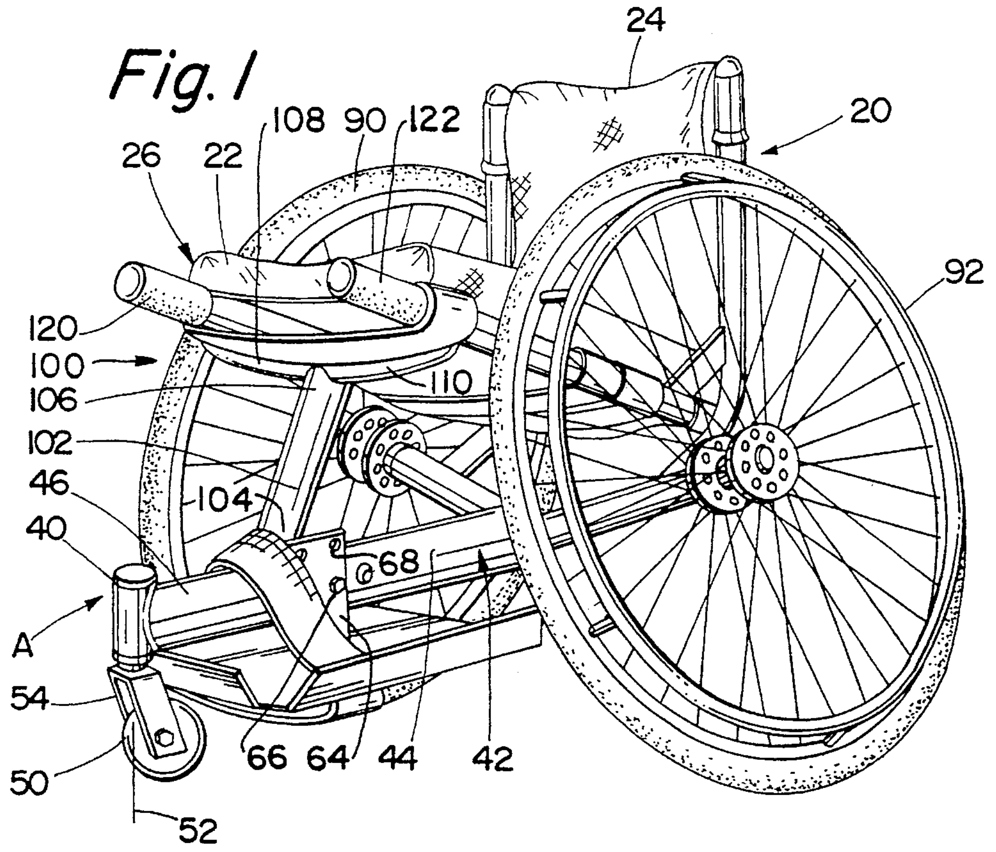
FIG. 1 is a perspective view of a first preferred embodiment.

Referring now to the drawings wherein the showings are for purposes of illustrating the preferred embodiments of the invention only and not for purposes of limiting same, the FIGURES show a wheelchair A particularly useful for sport activities where a high degree of maneuverability is required. More particularly, and with reference to FIGS. 1–7, the wheelchair includes a seat 20 having a seat portion 22 and a seat back 24. As shown, the seat includes a cushion 26 which provides a two or three inch padding for comfort. The cushion is easily secured to a seat support assembly by straps, fasteners, or the like. Preferably, the seat back is oriented in a substantially upright or vertical direction while the seat portion 22 angles upwardly from a generally horizontal direction as it extends away from its interconnection with a base of the seat back. As shown, the included angle between the seat portion and seat back is less than 90° and greater than 45°. Stated in another manner, the seat has a raised front edge 28 of the seat portion so that the user is urged downwardly in the seat portion toward the seat back. As will be understood, the front edge of the seat portion is adapted for receipt adjacent and beneath a user's knees without unduly inhibiting movement in and out of the wheelchair.

A frame 40 particularly includes a main T-frame 42 comprised of a first member 44 that generally extends front to back at a central portion of the wheelchair. A first or front end 46 of the member 44 receives a front, small diameter wheel 50. As shown, the front wheel is a caster arrangement that allows free, rotational movement of the front wheel about a generally vertical axis 52. Mounting forks 54 of the front wheel are disposed at a small angle relative to the vertical axis so that a tight turning radius of the front wheel about the vertical axis 52 can be achieved.

Figure 2:
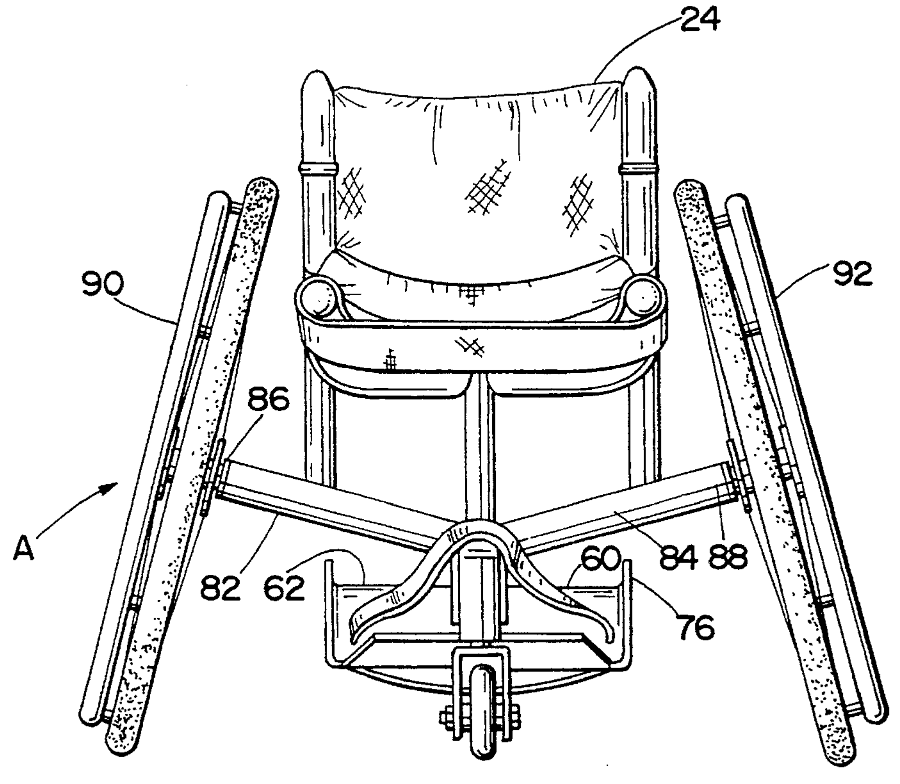
FIG. 2 is a front elevational view of the FIG. 1 embodiment.
Figure 3:
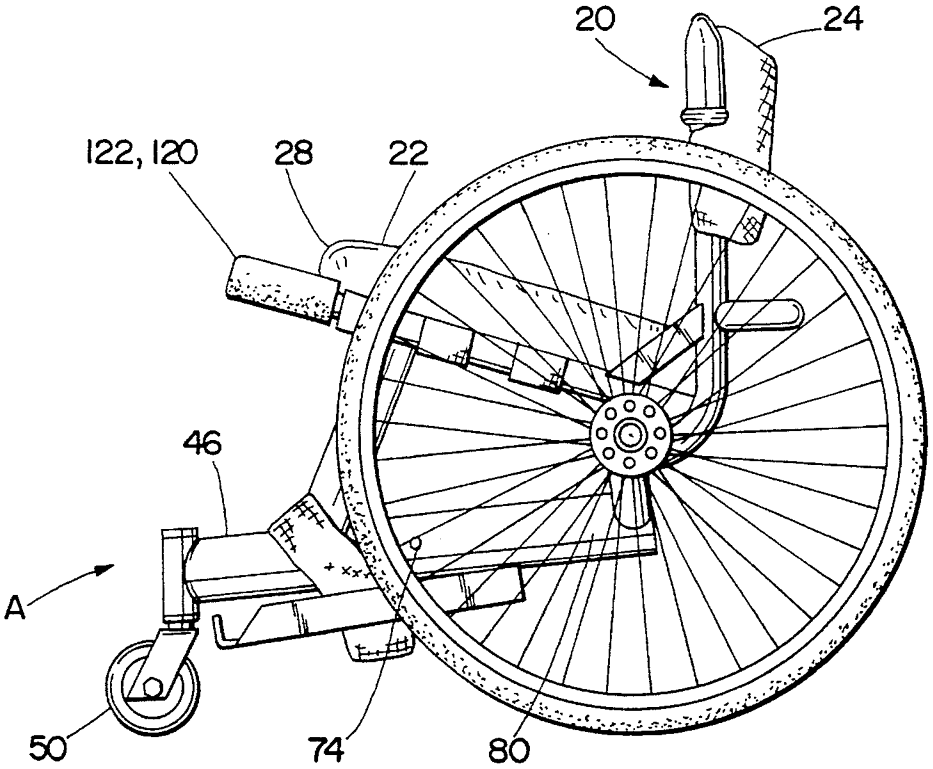
FIG. 3 is a side elevational view taken generally from the right-hand side of FIG. 2.
Figure 4:
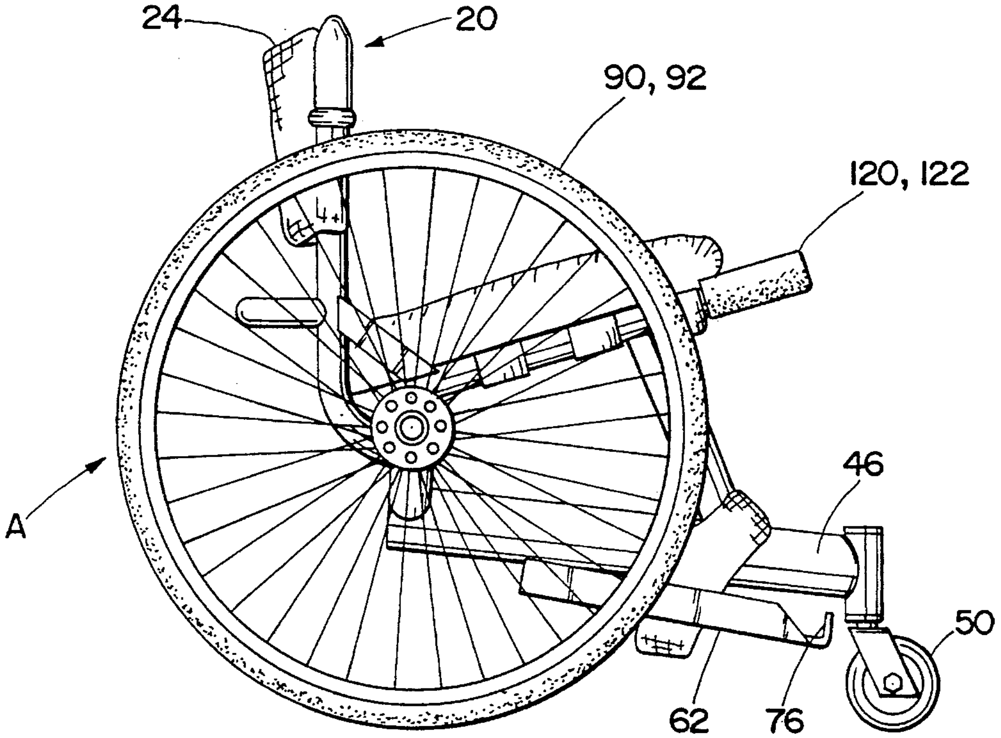
FIG. 4 is a side elevational view taken generally from the left-hand side of FIG. 2.
Figure 5:
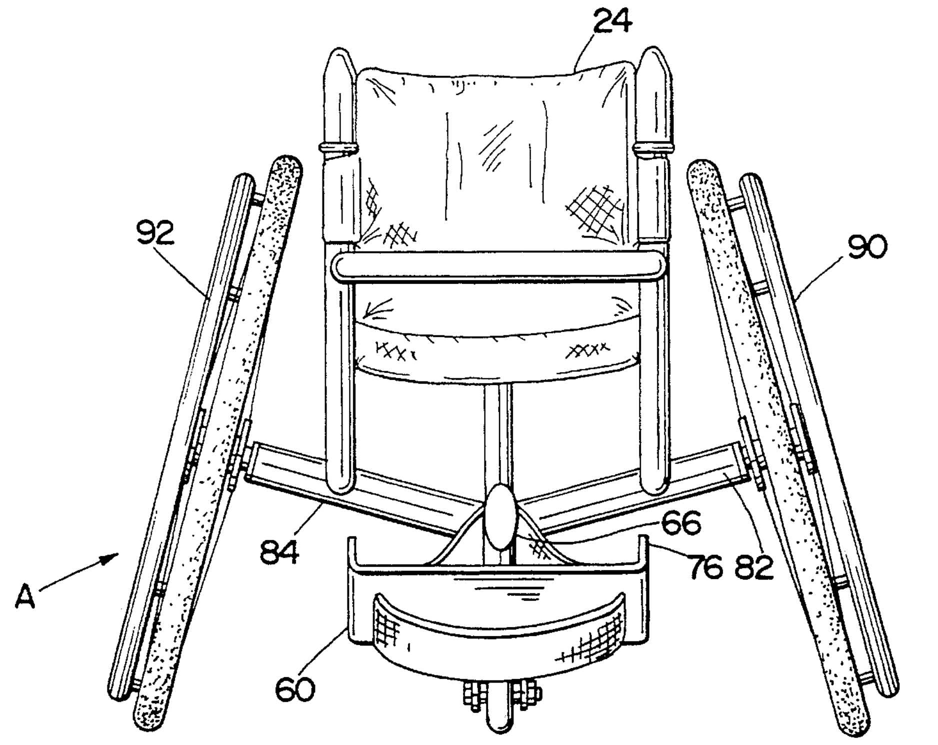
FIG. 5 is a rear elevational view of the FIG. 1 embodiment.
Figure 6:
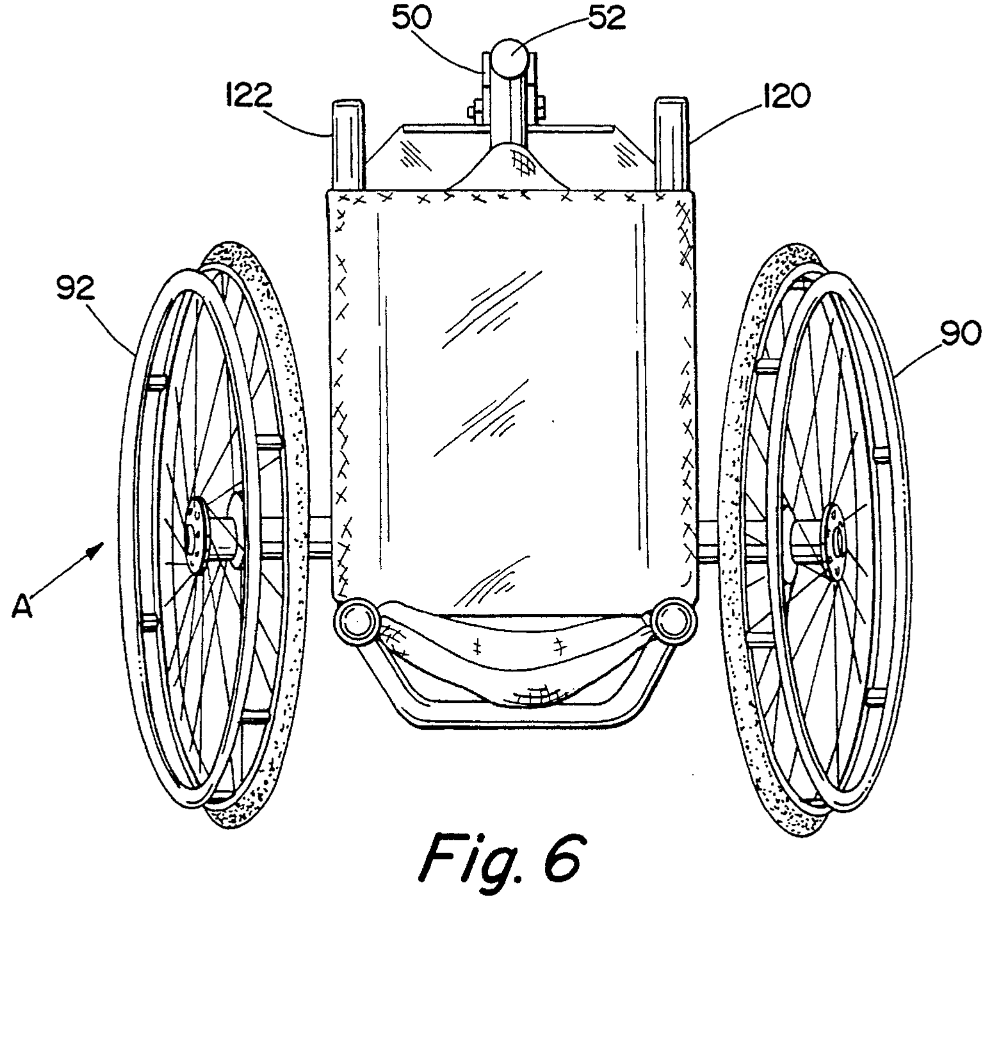
FIG. 6 is a top plan view of the FIG. 1 embodiment.

Disposed along an intermediate portion of the first member 44 is a footrest assembly 60 (FIG. 2). Particularly, the footrest assembly includes an enlarged plate 62 that is suspended beneath the first member 44 by a pair of brackets 64. The brackets are disposed on opposite sides of the first member 44 and secured thereto by any well known fastening arrangement such as a nut and bolt fastener 66. Each of the brackets 64 includes means that permit vertical adjustment of the footrest assembly relative to the frame 40. That is, multiple openings or slots provide adjustment so that the plate 62 can be raised or lowered to accommodate the comfort of a user as desired.

Additional openings 72, 74 are provided through the first member 44 so that the footrest may be adjusted forwardly and rearwardly as desired. By way of example only, four spaced openings are provided on the first member so that three distinct front to rear adjustment positions can be achieved if a pair of fasteners secure the footrest assembly via the brackets to the first member 44. Of course, still other adjustable mounting arrangements may be used without departing from the scope and intent of the subject application.

Figure 7:
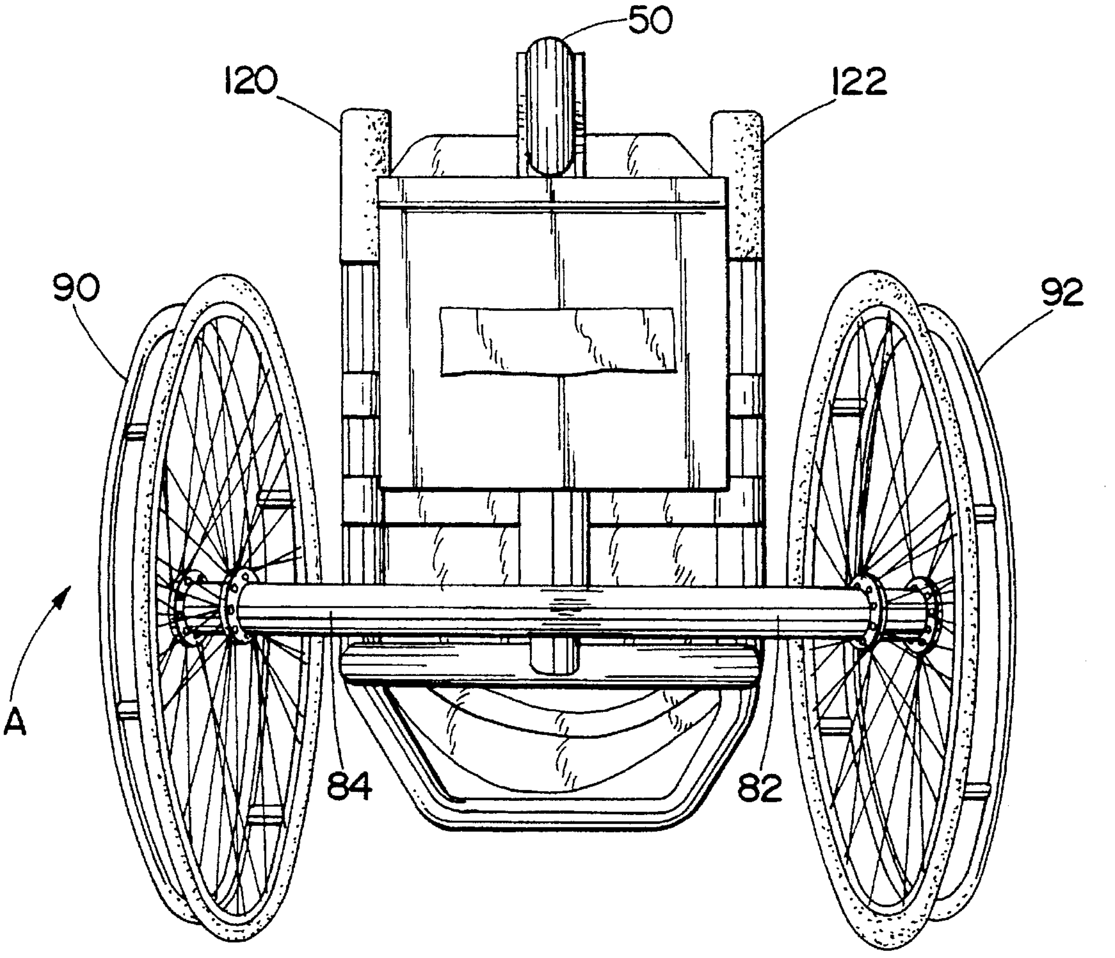
FIG. 7 is a bottom plan view of the FIG. 1 embodiment.

A second or rear end 80 of the first member is disposed beneath the seat 20 (FIGS. 2 and 7). As is apparent, the first member 44 is angled upwardly as it extends axially from the front end 46 toward the rear end 80. Extending generally perpendicularly outward from opposite sides of the rear end 80 of the first member are cross members 82, 84. As shown in this arrangement, a pair of cross members are used, although it will be understood that in still other arrangements a single cross member could be used to achieve the same result. Outer or distal ends 86, 88 (FIG. 2) of the cross members 82, 84, respectively, receive large diameter, first and second rear wheels 90, 92. By way of example only, the rear wheels are approximately twenty-four to twenty-six inches in diameter and are mounted at a camber of 10° to 16° relative to horizontal as best illustrated in FIG. 2. In this manner, the upper portion of each wheel is disposed above the seat portion 22 and located at a region convenient for the user to manually grasp the handrails mounted on the rear wheels. The rear wheels are of generally standard construction and may include spoke guards (not shown) if desired. The rear wheels are mounted for rotation relative to the frame to move the user in a desired direction.

According to the first preferred embodiment of FIGS. 1–7, a seat support assembly includes a framework 100 (FIG. 7) to which the cushion portions of the seat are secured. The fixed orientation between the seat portion and seat back are maintained by the framework and usually comprises a peripheral framework with one or more cross members that provide adequate support for the cushions. A pair of upright posts are secured at lower, curved ends to rear faces of cross members 82, 84. At the beginning of the curved ends, first and second side members extend forwardly along opposite sides of the wheelchair, terminating in a pair of handles which will be described in greater detail below. The upright posts are maintained in generally parallel relation by a cross member that spans between the posts at the base of the seat back.

As shown in the FIG. 1 embodiment, an enlarged support member 102 extends from an intermediate region of the first member 44 of the frame, i.e., adjacent the footrest assembly, and angles upwardly for operative connection at a second end 106 with the seat framework 100. The second end 106 includes generally perpendicularly extending members 108, 110 that transfer the load and forces from the seat framework to the support 102 which, in turn, transfers the forces through the first member 44 to the wheels.

Still another feature incorporated into the first preferred embodiment are a pair of handles 120, 122 that extend outwardly from the seat framework 100. Preferably, the handles are disposed generally in the plane of the seat portion 22 and extend sufficiently outwardly from the front edge 28 of the seat to provide lateral support to a user's legs. Simultaneously, the handles allow the user to grasp same for purposes of stability. For example, if the user stretches outwardly from the chair with one arm, his other arm can grasp a handle for purposes of balance and stability. The combined features of the included angle of the seat, which urges the buttocks of the user rearwardly toward the seat back, in combination with grasping one of the handles 120, 122, in addition to the footrest assembly, provides allow center of gravity and stable arrangement for the user. Moreover, the outwardly extending handles are preferred since they permit an open frame arrangement that facilitates ingress and egress from the chair.

As shown in FIG. 1, the first end 104 of the support is disposed at an intermediate region just rearwardly of the footrest. If desired, the first end may also be located between the front wheel and the footrest. This demonstrates that variations can be made in the design without substantial alteration of the concept.

Turning next to the second preferred embodiment of FIG. 8, the support 102 of the prior embodiments has been eliminated and replaced by a pair of side supports 130, 132. These supports 130, 132 extend from the seat framework 100 at the location of the handles 120, 122 of the prior embodiments. Thus, the handles are eliminated in this arrangement and instead the side supports extend outwardly from the seat framework and curve downwardly for connection with a U-shaped member 134. The U-shaped member 134 has opposite ends 136, 138 that are secured to the cross members 82, 84 at locations between the member 44 and the rear wheels. The lower ends of the side supports are then secured to the U-shaped member generally along curvilinear regions of the U-shaped member. In this manner, the side supports 130, 132 and U-shaped member 134 provide additional protection to the user's legs, as well as additional lateral support during use.

Turning last to the embodiment of FIG. 9, a V-shaped frame is used to support the front edge of the seat. More particularly, side supports 150, 152 extend outwardly from the seat framework, again, at the area from which handles 120, 122 of the prior embodiments extended. Rather than curving downwardly in generally parallel fashion as shown in the FIG. 9 embodiment, the side supports 150, 152 converge much more sharply and are directly connected to the front end 46 of member 44. As shown, this interconnection is a welded arrangement just rearward of the front wheel 50. Since the side supports 150, 152 are directly connected to the first member 44, the U-shaped member 134 of the FIG. 8 embodiment is also eliminated. The side supports 150, 152 provide sufficient lateral support so that, if desired, the footrest plate 62 need not incorporate any lip 76. On the other hand, such a lip could be incorporated to the front or side edges of the plate if deemed necessary.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A wheelchair comprising:

a seat;

first and second rear wheels;

a small diameter front wheel;

a frame having a first member centrally located between the rear wheels and extending forwardly toward the front wheel, second and third members extending substantially perpendicularly from operative connection adjacent a first end of the first member and rotatably receiving the first and second rear wheels on distal ends of the second and third members, respectively, the first member angling downwardly relative to horizontal from the first end thereof toward a second end that pivotally receives the front wheel, and a seat support assembly extending upwardly from the first member and receiving the seat thereon at a location disposed between the rear wheels; and first and second handles extending from opposite sides of the seat support assembly and having outer terminal ends disposed outwardly from and in substantially the same plane as the seat.

2. The wheelchair as defined in claim 1 further comprising a footrest connected with and extending from the frame first member.

3. The wheelchair as defined in claim 2 wherein the footrest includes a plate having multiple openings permitting adjustable mounting on the frame.

4. The wheelchair as defined in claim 3 wherein the footrest mounting assembly includes means for varying the position of the footrest at different locations between the front and rear wheels.

5. The wheelchair as defined in claim 4 wherein the footrest mounting assembly includes means for varying the location of the footrest in a generally vertical direction relative to the seat.

6. The wheelchair was defined in claim 2 wherein the footrest includes a raised lip on a front edge of the footrest to limit movement of a user's feet toward the front wheel.

7. The wheelchair as defined in claim 2 wherein the footrest includes a strap connected thereto to facilitate retention of a user's feet on the footrest.

8. The wheelchair as defined in claim 1 wherein the handles extend sufficiently outward from the seat portion to abut against a user's legs.

9. The wheelchair as defined in claim 1 wherein the seat support assembly includes a first support angling upwardly from the first member toward the seat and a cross member supporting opposite side edges of the seat.

10. The wheelchair as defined in claim 1 wherein the seat includes a generally planar seat portion angled relative to horizontal such that a forward portion thereof is elevated relative to a rear portion thereof and a seat back generally vertically oriented to define an included angle of less than 90° with the seat portion for urging a user into the seat.

11. A wheelchair comprising:

a seat having a generally planar seat portion angled relative to horizontal such that a forward portion thereof is elevated relative to a rear portion thereof and a seat back generally vertically oriented to define an included angle of less than ninety degrees with the seat portion for urging a user into the seat;

an elongated member having a front end and a rear end, oriented to locate the elongated member centrally beneath the seat, first and second members extending outwardly from the rear end of the elongated member and being angled relative to horizontal so that outer ends of each of the first and second members are elevated relative to the elongated member;

first and second enlarged diameter rear wheels rotatably mounted on the outer ends of the first and second members, respectively, and being cambered for rotation about axes substantially coincidental with the angles of the first and second members, respectively;

a small diameter front wheel received on the front end of the elongated member; and a footrest mounted on the elongated member at a location intermediate the front and rear ends so that a user's feet are disposed inwardly from the front end of the elongated member.

12. The wheelchair as defined in claim 11 wherein the footrest includes a plate having multiple openings therein for adjustably mounting the height of the footrest relative to the elongated member.

13. The wheelchair as defined in claim 11 further comprising first and second handles extending from opposite sides of and from beneath the seat portion and having outer terminal ends disposed outwardly from and in substantially the same plane as the seat portion.

* * * * *